UNITED STATES PATENT OFFICE.

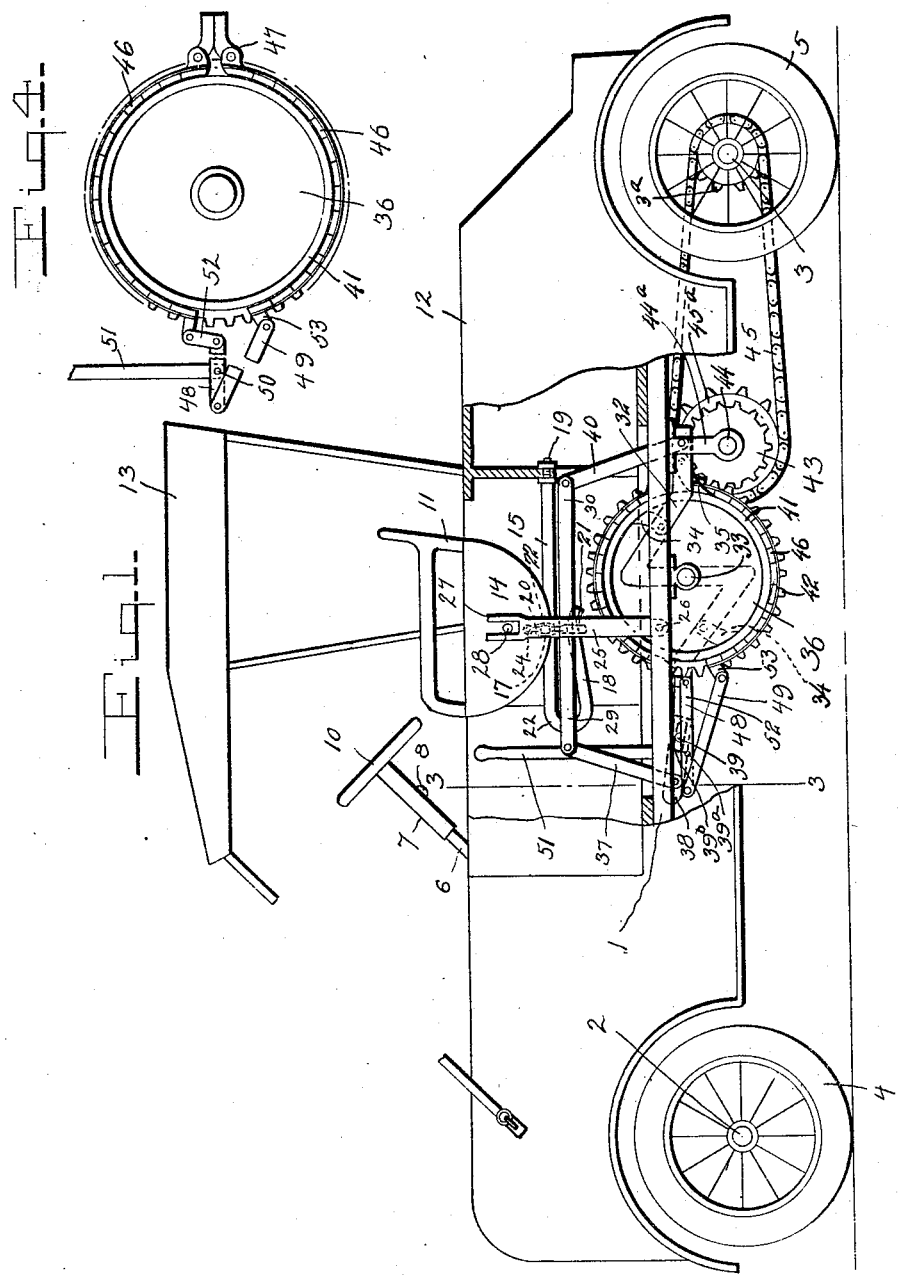

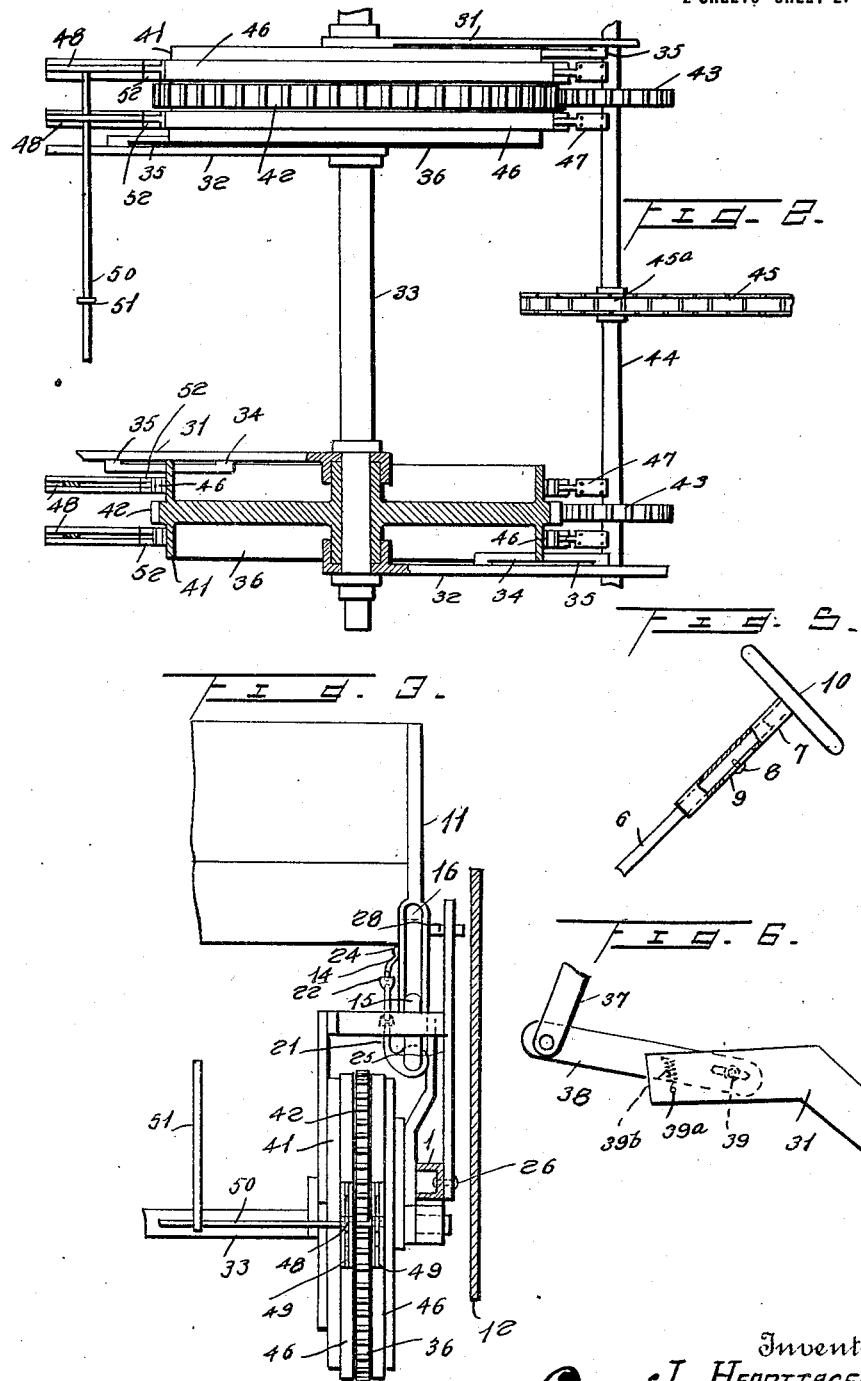

JOHN HEARTTAGEN, OF ALLENTOWN, PENNSYLVANIA, ASSIGNOR OF ONE-HALF TO EDWIN F. WORMAN, OF COPELY, PENNSYLVANIA.

OCCUPANT-PROPELLED VEHICLE.

1,304,310.     Specification of Letters Patent.     Patented May 20, 1919.

Application filed May 5, 1916. Serial No. 95,585.

*To all whom it may concern:*

Be it known that I, JOHN HEARTTAGEN, a citizen of the United States, residing at Allentown, in the county of Lehigh and State of Pennsylvania, have invented certain new and useful Improvements in Occupant-Propelled Vehicles; and I do hereby declare the following to be a full, clear, and exact description of the invention, such as will enable others skilled in the art to which it appertains to make and use the same.

The invention relates to improvements in occupant propelled vehicles.

The object of the present invention is to improve the construction of occupant propelled vehicles and to provide a simple, practical and comparatively inexpensive occupant propelled vehicle of strong and durable construction designed for the accommodation of one or more persons and adapted for the use of children, invalids, timid persons and others who prefer a vehicle of this character to automobiles, street cars and the like.

A further object of the invention is to provide an occupant propelled vehicle designed for use at summer resorts and various amusement places to take the place of rolling chairs and capable of being easily operated and of being propelled at a comparatively high speed when desired.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawings—

Figure 1 is a side elevation partly in section of an occupant propelled vehicle construction in accordance with this invention, Fig. 2 is a horizontal sectional view of the same, Fig. 3 is a transverse sectional view taken substantially on the line 3—3 of Fig. 1, Fig. 4 is a detail vertical sectional view illustrating the construction of the brake mechanism, Fig. 5 is a detail view illustrating the construction of the steering post or shaft, Fig. 6 is a fragmentary detail of the connections between one of the operating levers and the co-acting pawl carrying lever.

Like numerals of reference designate corresponding parts in the several figures of the drawings.

Referring particularly to Figs. 1 to 5 inclusive of the accompanying drawings, 1 designates a supporting frame mounted upon front and rear axles 2 and 3 which are provided with suitable wheels 4 and 5. The front axle is designed to be connected with suitable steering mechanism, not shown, including a steering shaft or post 6 having an upper extensible section 7 slidably connected with the lower portion or body of the shaft or post 6 and limited in its sliding movement by a pin 8 operating in a slot 9. The slidable section 7 which is equipped with a steering wheel 10 is movable backwardly or forwardly to facilitate the operation of the mechanism hereinafter described and to permit the occupant to oscillate a rocker or rocking seat 11 with greater ease and convenience than would be possible with an ordinary steering shaft or post. The frame 1 carries a suitable body 12 which is preferably in the form of a body of an automobile and which is designed to be provided with a suitable vehicle top 13 but any other desired form of vehicle body may of course be provided.

The oscillatory seat 11 which is provided with rockers 14 is supported by springs 15 arranged in grooves 16 in the lower edges of the rockers and provided with tensioning devices 17. Each spring consists of a horizontal body portion on which the rocker is arranged and the lower arm 18 extending downwardly and rearwardly from the front of the body portion and forming a front loop. The body portion is secured at its rear end 19 and the arm 18 is connected with the tension device 17 which consists of upper and lower sections 20 and 21 and a connecting turn buckle 22 engaging right and left hand screw threads of the upper and lower sections 20 and 21 and adapted to shorten the effective length of the said sections. The tensioning device is pivoted at its upper end 24 to the rocker and its lower end is secured to the rear end of the arm or portion 18 of the spring. By adjusting the tensioning device the tension or stiffness of the spring may be regulated. The spring provides a yieldable support for the oscillatory seat and the tensioning devices enable the spring to be adjusted to suit the number and size of the occupants. The vehicle is adapted to be constructed for the use of one or more persons who oscillate the seat by rocking the same in a manner similar to the use of an ordinary rocking chair.

The oscillatory seat is connected at each side with an upright lever 25 pivoted at its lower end, as at 26, to the frame of the vehicle and arranged to swing backwardly and forwardly. The lever 25 is provided at its upper end with a slot or bifurcation 27 for the reception of a pin or projection 28 extending horizontally from the rocker and adapted to engage the opposite walls of the slot or bifurcation 27 whereby the rocking of the seat will swing the lever. Instead of providing a pin 28 a rod or any other similar means may be employed for connecting the upper end of the lever 25 with the seat. The lever at each side of the vehicle is provided with forwardly and rearwardly extending arms 29 and 30 which are connected with a pair of oscillatory levers 31 and 32 mounted on a shaft 33 and carrying pawls 34 and 35, adapted to engage a wheel 36. The forwardly extending arm 29 is connected by a link 37 with one arm of an intermediate lever 38 fulcrumed intermediate of its ends on the outer end portion of lever 31, as at 39, and arranged at an inclination in a direction longitudinally of the vehicle. This lever is connected to lever 31 by pin and slot connections, as at 39, so as to accommodate upward movement thereof, and has its downward movement positively limited by a stop pin 39ª carried by lever 31. A tension spring 39ᵇ secured to lever 31 and lever 38 acts to normally hold the latter in contact with the pin, as in Fig. 6 of the drawings. The rearwardly extending arm 30 carried by upright 25 is similarly connected by the link 40 with the rear pawl carrying lever 32, the connections for this arm being reversed relative to the connection for arm 29. By this arrangement of parts both sets of the pawls are caused to frictionally grip the wheel 36 to assist in actuating the same on both the backward and the forward movement of the oscillatory seat.

The sliding handle or steering wheel is adapted to move backwardly and forwardly with the occupant of the seat and it will be clear that an easy motion is provided for operating the vehicle. The wheels 36 which have relatively wide rims 41 are provided centrally thereof with exterior spur teeth 42 which mesh with spur pinions 43 mounted on a counter shaft 44 which is rotatably supported by hangers 44ª and connected by sprocket chain 45 passed about a sprocket wheel 45ª secured on shaft 44 and about a sprocket wheel 3ª secured on the rear driving axle 3.

The wheels 36 are also engaged by brake bands 46 consisting of straps arranged in pairs and secured together at one end as at 47 and connected at the other end with arm 48 fixed to a transverse rock shaft 50 which has an operating arm or handle 51. The arm 48 is connected with its coacting strap by a short link 52 and the other arm which extends in the opposite direction from the rock shaft is connected by a link 49 and lug 53 to its coacting strap. By this arrangement the straps will be moved simultaneously into and out of engagement with the wheel 36 when the lever or operating arm 51 of the rock shaft is operated. The brake is adapted to afford a complete control of the vehicle which may be equipped with a direction indicator and a suitable signal and also with lamps of any desired design. The pawl or dog carrying levers have approximately V-shaped inner portions which are located above and below the shaft 33 and the pawls or dogs engage the rim at the inner and outer edges thereof and at the inner and outer faces of the same being arranged in pairs as clearly shown in Fig. 2 of the drawings. The pawls or dogs frictionally grip the rim of the wheel 36 and positively actuate the same.

What is claimed is:—

1. The combination with a wheeled vehicle of a propelling mechanism including a rockably mounted seat, means for transmitting motion from said seat to the wheels of the vehicle so as to cause rotation thereof, and a spring supporting the seat and consisting of a body portion secured at one end and having its other end portion looped to provide a spring arm disposed beneath and in parallel spaced relation with said body, and an adjustable tensioning device secured to said arm and to the seat for holding the seat in position upon the body portion of the spring, said device also serving to vary the tension of said spring arm.

2. The combination with a wheeled vehicle, of a rotary element, gearing for transmitting motion from the rotary element to the wheels of the vehicle, said rotary element being provided with smooth rim portions, oppositely directed levers rockably mounted adjacent said rotary element, the axis of movement of the levers being coincident with the axis of rotation of said element, friction pawls carried by said levers and adapted to engage the smooth rim portions of the rotary element so as to cause rotation thereof when the levers are rocked, said pawls engaging the rim of the rotary element at the inner and outer faces thereof and at diametrically opposite points, a rockably mounted seat and means for causing movement of said levers in opposite directions so as to rotate the said rotary element when the seat is rocked.

3. The combination with a wheeled vehicle, of a rotary element having central gear teeth, a pinion meshing with said teeth, driving connections between said pinion and the wheels of the vehicle, said rotary element being provided with smooth rim portions located at opposite sides of the gear teeth and adapted to be engaged by braking elements, a lever provided with friction pawls engaging the rim portions of the rotary elements so as to cause rotation thereof when the lever is rocked, said lever being mounted coaxially with the rotary element, an oscillatory seat, and connections between said seat and the lever for causing rocking thereof when the seat is oscillated.

4. In operating means for wheeled vehicles, a driving wheel having a central portion provided with gear teeth and constituting a driving gear, said wheel being also provided with a smooth rim contiguous to said driving gear, a lever mounted coaxially with the wheel, opposed friction pawls engaging the interior and exterior surfaces of the rim portion of said wheel and carried by the lever, a rockable seat, and connections between said lever and seat for oscillating the lever when said seat is rocked so as to cause rotation of the wheel by means of said pawls.

5. In driving means for vehicles, a driving wheel provided with a central gear portion and having a smooth rim contiguous thereto, oppositely directed levers mounted coaxially with said wheel, oppositely directed pairs of friction pawls carried by said levers and engaging the inner and outer surfaces of the rim portion of the wheel so as to cause rotation thereof when the levers are rocked in opposite directions, the pairs of pawls being disposed diametrically opposite of the wheel, a rockably mounted seat, and connections between said seat and the levers for causing rocking of the levers in opposite directions when the seat is rocked.

In testimony whereof I affix my signature in presence of two witnesses.

JOHN HEARTTAGEN.

Witnesses:
THOMAS T. KUCH,
OLIVER WEAVER.

Copies of this patent may be obtained for five cents each, by addressing the "Commissioner of Patents, Washington, D. C."